United States Patent [19]

Seidelberger

[11] 4,072,560
[45] Feb. 7, 1978

[54] PRESSURIZED-WATER REACTOR PRESSURE VESSEL EMERGENCY CORE COOLANT CONNECTION ARRANGEMENT

[75] Inventor: Emmerich Seidelberger, Erlangen, Germany

[73] Assignee: Kraftwerk Union Aktiengesellschaft, Mulheim (Ruhr), Germany

[21] Appl. No.: 614,152

[22] Filed: Sept. 17, 1975

[30] Foreign Application Priority Data

Sept. 26, 1974   Germany .............................. 2446090

[51] Int. Cl.² .............................................. G21C 9/00
[52] U.S. Cl. ......................................... 176/38; 176/87
[58] Field of Search ............................ 176/37, 38, 61

[56] References Cited

U.S. PATENT DOCUMENTS

| | | | |
|---|---|---|---|
| 3,211,621 | 10/1965 | Creagan | 176/18 |
| 3,274,065 | 9/1966 | Kierulf | 176/61 |
| 3,528,884 | 9/1970 | Collier et al. | 176/37 |
| 3,818,935 | 6/1974 | Karker et al. | 137/590 |
| 3,976,834 | 8/1976 | Bevilacqua | 176/38 |

FOREIGN PATENT DOCUMENTS

| | | |
|---|---|---|
| 812,891 | 7/1974 | Belgium. |
| 1,253,830 | 11/1967 | Germany. |
| 1,815,047 | 6/1970 | Germany. |
| 2,316,007 | 10/1974 | Germany. |

OTHER PUBLICATIONS

"Steam Generation" Power, Apr. 1970, pp. 90–91.

*Primary Examiner*—Samuel W. Engle
*Assistant Examiner*—Ralph Palo
*Attorney, Agent, or Firm*—Kenyon & Kenyon, Reilly, Carr & Chapin

[57] ABSTRACT

In a nuclear reactor, a line for supplying emergency coolant is connected directly to the reactor pressure vessel and equipped in the interior of the latter with an emergency coolant flow-directing device whose exit runs parallel to the wall of the pressure vessel in a direction toward the lower edge of the core. The invention provides, particularly in pressurized-water reactors, more rapid flooding of the reactor core in case of a loss-of-coolant accident.

3 Claims, 3 Drawing Figures

PRESSURIZED-WATER REACTOR PRESSURE VESSEL EMERGENCY CORE COOLANT CONNECTION ARRANGEMENT

BACKGROUND OF THE INVENTION

The invention concerns a nuclear reactor, particularly a pressurized-water reactor, with a reactor pressure vessel, into which lines for feeding-in an emergency core coolant lead. Heretofore, the lines for the emergency coolant realized in actual practice, used to end at the pipelines or connecting stubs of the main coolant loop for the normal coolant. Therefore, they did not lead directly into the reactor pressure vessel. The reason for this appears to have been that nuclear engineers wanted to avoid the otherwise required, additional breakthroughs of the reactor pressure vessel wall, which increase the cost of the reactor pressure vessel, without apparently having any advantage over the practice actually used.

SUMMARY OF THE INVENTION

It is an object of the present invention to reduce the expenditures required for such emergency cooling.

Surprisingly, this has proven possible by providing an emergency cooling line leading directly into the reactor pressure vessel, when in the interior of the reactor pressure vessel, a flow-directing device is used, whose exit runs parallel to the wall of the reactor pressure vessel in a direction toward the lower edge of the core. Contrary to the thinking that attaching the emergency cooling line directly at the reactor pressure vessel would result in an increase of the expenditures for the emergency cooling, the effectiveness of the emergency cooling is thereby increased to such an extent that the overall cost of the emergency coolant system can be decreased, because a more intensive emergency coolant flow is achieved by the flow-directing device.

One or more emergency cooling lines provided with such flow-directing devices in the reactor pressure vessel, result in a bundling of the emergency coolant flowing into the reactor pressure vessel and takes care of the condition that the flow of the normal pressurized coolant, which with the usual arrangement counteracts the flow of the emergency coolant flowing from the reactor pressure vessel in the event of a loss-of-coolant accident, is largely pushed to one side. The emergency coolant gets to the bottom of the reactor pressure vessel and the underside of the reactor core practically as a closed jet, even if the normal coolant still escapes from the reactor pressure vessel, in the event of a break of the cold leg, against this emergency coolant flow direction, particularly when the escaping normal coolant is in the form of steam. One therefore obtains with the invention considerably faster wettng of the reactor core and avoids the high fuel rod temperatures which can otherwise occur after the normal coolant is blown out because of the accident. The time interval between the start of the emergency coolant feeding-in and the start of the desired actual flooding of the core, is reduced by more than one-half over the usual time, and it has been found that the cladding tube temperatures can thereby be lowered by 50° to 100° K. Such lower cladding tube temperatures result also in correspondingly lower permanent elongation in the circumferential direction (swelling of cladding tubes), so that the narrowing of the cooling channels caused by the accident also reamins within limits. This again benefits the emergency cooling investment cost.

In a nuclear reactor with a core barrel which, together with the reactor pressure vessel, defines a ring gap from which the cold leg of a reactor main coolant loop starts, the flow-directing device may be arranged in the ring gap, for instance, in the vicinity of the cold leg. It provides from there a cooling effect similar to that in normal operation, although the flow is in the opposite direction. Furthermore, when the flow-directing devices are arranged in the ring gap space, they cannot be affected by damage that might occur in the core inside the core barrel.

A cap covering up the mouth of the emergency cooling line may advantageously be provided as the flow-directing device. The exit cross section of the cap is preferably not much larger than the cross section of the emergency cooling line, as a strong, compact jet can be obtained thereby, as desired. However, a cross section which is constricted for the nozzle effect can also be provided at the exit of the cap, in order to increase the velocity of the emergency coolant additionally. A limit for the constriction is given only by the increase in the flow resistance and therefore, by the increase of the gas pressure required in the emergency coolant accumulator (pressurizer), or the increase of the pump power, required for the emergency cooling which, of course, may have to be supplied by emergency power units.

BRIEF DESCRIPTION OF THE DRAWINGS

A specific example of the present invention is illustrated by the accompanying drawings, in which.

DETAILED DESCRIPTION OF THE INVENTION

To explain the invention in further detail, an embodiment example will be described in the following, making reference to the above drawings.

Figure 1:
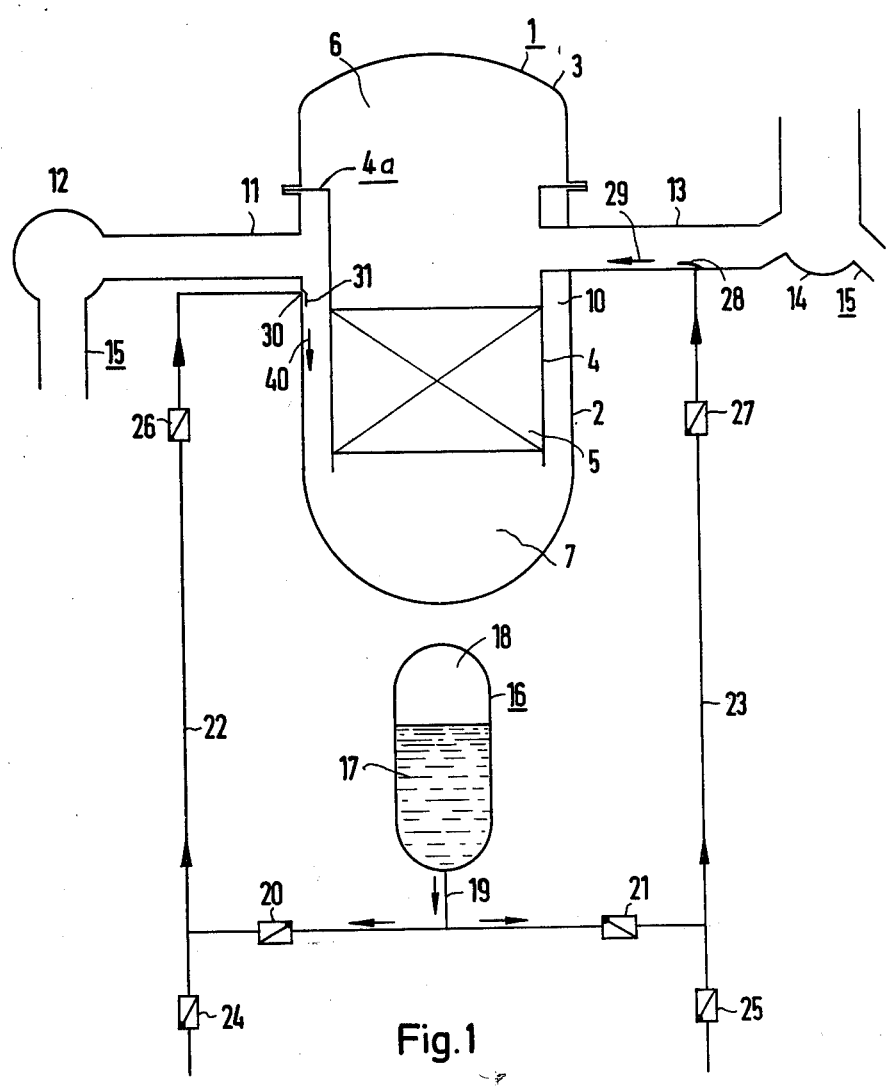
FIG. 1 schematically shows in vertical section, a pressurized-water reactor and, diagrammatically, its emergency core coolant system.

In FIG. 1, a pressurized-water reactor may, say, 1000 MWe is shown schematically, whose essential component is a largely cylindrical reactor pressure vessel 1. In the lower part 2 of the reactor pressure vessel 1, below the usual removable head 3, a core barrel 4 is arranged concentrically, in which the reactor core 5 is located. The core barrel and its mounting flange 4a divide the vessel's interior space into an upper plenum 6 above the core and a lower plenum 7 below the core.

Together with the lower part 2 of the reactor pressure vessel 1, the core barrel 4 forms a ring space 10. To the latter is connected the cold main coolant line 11, in which the light water used as the primary coolant is pumped back into the reactor pressure vessel 1 by a reactor coolant pump 12. Normally the primary coolant from the line 11 flows into an upper end of the ring space, the core barrel flange 4a closing the top of this ring space, and downwardly through the ring space to the latter's open bottom end and therefore into the lower plenum 7. Normally, the primary coolant flows from the lower plenum 7 through the reactor core 5 to the upper plenum 6. There it gets into the hot main coolant line 13, which leads to a steam generator 14.

The steam generator 14 is connected with the pump 12 in a manner not shown, to form a closed coolant loop 15.

In case the normal coolant escapes in the event of a break of the main coolant lines 11, 13, accumulators 16 are provided for the emergency cooling, of which only one is shown. In the accumulators, borated water 17 which preferably serves as the coolant, is under the pressure of a gas cushion 18. The outlet 19 of the accumulator 16 is connected via two check valves 20 and 21 to emergency coolant lines 22 and 23, which can be supplied with supplemental coolant via check valves 24 and 25, by emergency feed pumps, not specifically shown. The emergency cooling lines 22, 23 lead to the reactor pressure vessel 1 via two further check valves 26 and 27.

The emergency cooling line 23 is connected to the hot leg 13 of the main coolant loop 15. At the mouth of the emergency cooling line 23 there is arranged inside the pipe a cap 28 by means of which the emergency coolant is directed into the upper plenum 6, as indicated by the arrow 29.

The emergency cooling line 22 leads directly to the lower part 2 of the reactor pressure vessel 1. It is important that the connection point 30 of the cold feed line 22 is located above the upper edge of the core, so that also in the event of a break of such an emergency cooling line, the core 5 can be covered by the emergency cooling water. Contrary to the way shown in the drawing, actually the connections 30 of four emergency lines are arranged in this plane as desired, in the circumferential direction, but uniformly distributed over the circumference of the vessel.

Figure 2:
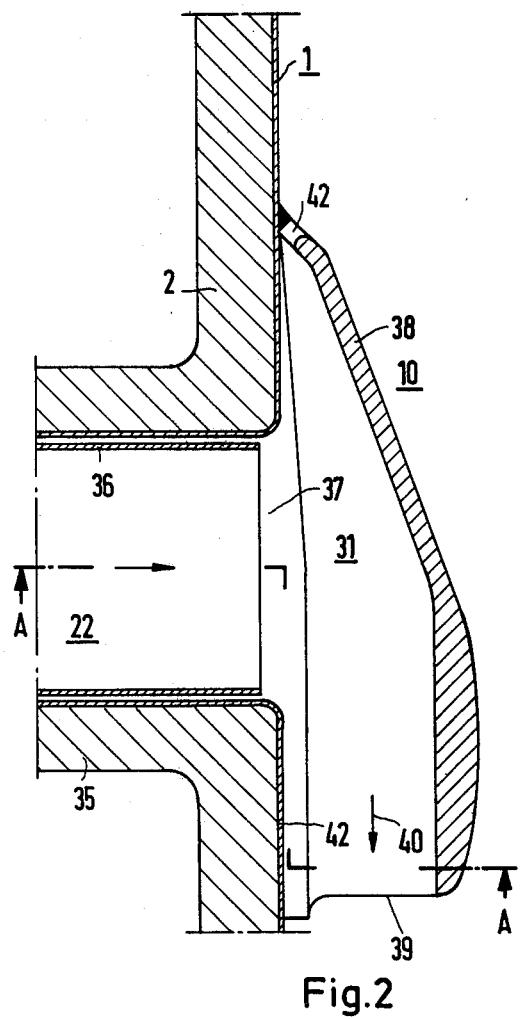
FIG. 2 in vertical section shows the example in detail.

At the connection point 30, the mouth or opening into the vessel, is provided inside the ring space 10 with a flow-directing device 31, as is shown more clearly on a larger scale in a vertical cross section in FIG. 2.

Into the lower part 2 of the reactor pressure vessel 1 is welded a feed nozzle 35, in which a centered inner pipe 36 is arranged for protection against thermal stresses. On the inside of the reactor pressure vessel 1, situated in the ring space 10, the mouth 37 is covered up by a cap 38, which has an exit opening 39 directed downward. As the arrow 40 shows, the outlet opening 39 leads parallel to the vessel's straight vertical inside cladding 42, to the lower plenum 7 on the inside of the wall of the reactor pressure vessel 1, i.e., in the direction toward the lower edge of the reactor core 5.

Figure 3:
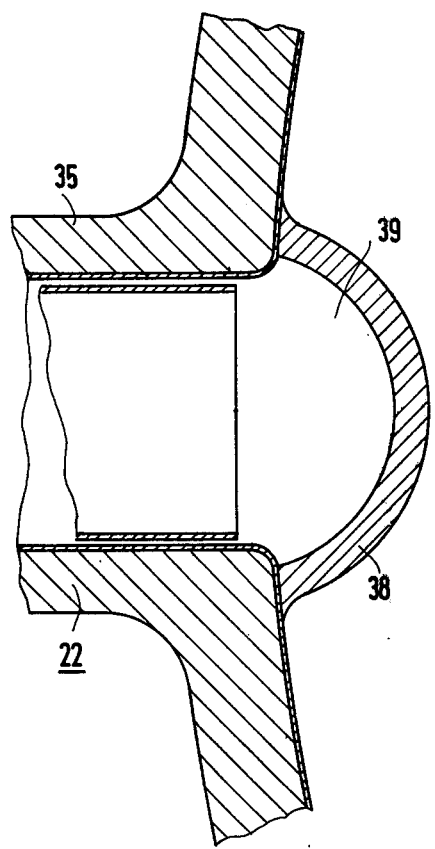
FIG. 3 is a cross section taken on the line A—A in FIG. 2.

From FIG. 3, which shows a horizontal cross section through the mouth of the emergency cooling line 22 with the nozzle 35, will be seen that the cap 38 has an approximately semicircular cross section, which increases from the upper edge to the lower edge, to the dimension of the outlet opening 39. The total cross section should not be larger than the cross section of the emergency cooling line 22. It can advantageously be narrowed down toward the outlet 39, so that the cap 38 forms, together with the inside of the reactor pressure vessel 1, a feeding nozzle for the emergency coolant 17. Thereby is obtained a strongly bundled jet, which runs parallel to the wall 2 in the direction of the arrow 40 and still reaches the lower edge of the reactor core 5 with great impact, and, therefore, in sufficient quantity, while the primary coolant still flows out in the direction opposite to the arrow 40 in the event of a break of the main coolant line 11. This takes care of a substantial shortening of the time in which the reactor core 5 is not wetted, so that the temperatures in the core remain considerably lower.

It is indicated in FIG. 2 that at the upper, pointed edge of the cap 38, an opening 42 may be provided. The latter prevents a zone of stagnant water from forming under the cap 39 in normal operation, with undesirably high temperatures.

The invention can be applied to advantage also in other water-cooled reactors, e.g., boiling-water reactors or heavy-water reactors. In addition, an application in gas-cooled reactors also is conceivable.

What is claimed is:

1. A pressurized-water reactor pressure vessel emergency core coolant connection arrangement comprising a pressurized-water reactor pressure vessel having an upstanding wall, a core on the inside of said wall and having a lower edge, an emergency core coolant opening being formed through said wall above said edge, means on said outside for supplying said opening with pressurized emergency core coolant, and nozzle means on the inside of said wall for directing said coolant downwardly substantially parallel with and in contact with said wall in the direction of said edge, a core barrel radially surrounding said core and the barrel forming an annular gap between itself and the inside of the pressure vessel's said wall and the gap having a closed top and an open bottom adjacent to the core's said lower portion, said vessel having a main coolant loop connection with said gap adjacent to the gap's said closed top and said emergency core coolant opening and nozzle means being adjacent to an upper portion of said gap and being separate from said coolant loop connection, said nozzle means being in the form of a cap fixed to the inside of said vessel and covering said emergency core coolant opening, said cap having a closed top and a concave inner surface and a bottom forming a downwardly-directed orifice.

2. The arrangement of claim 1 in which the cap's said inner surface extends downwardly from said opening, to its said bottom to form with the inside of the vessel's said wall, a downwardly-directed flow passage of extended length for ejecting a solid high-velocity stream of the emergency core coolant downwardly toward the core's said lower edge and the bottom of said pressure vessel.

3. The arrangement of claim 2 in which the cap's inner surface forms with the pressure vessel's inside an emergency coolant flow passage having a cross-sectional area not greater than that of said emergency core coolant opening.

* * * * *